United States Patent
Leonard et al.

(10) Patent No.: US 9,995,511 B2
(45) Date of Patent: Jun. 12, 2018

(54) MAGNETIC REFRIGERATION SYSTEM WITH IMPROVED FLOW EFFICIENCY

(71) Applicant: Astronautics Corporation of America, Milwaukee, WI (US)

(72) Inventors: John Paul Leonard, Cambridge, WI (US); Jon Jay Auringer, Poynette, WI (US); Andre Michael Boeder, Monona, WI (US); Jeremy Jonathan Chell, Madison, WI (US); Carl Bruno Zimm, Madison, WI (US)

(73) Assignee: Astronautics Corporation of America, Milwaukee, WI (US)

( * ) Notice: Subject to any disclaimer, the term of this patent is extended or adjusted under 35 U.S.C. 154(b) by 610 days.

(21) Appl. No.: 14/556,424

(22) Filed: Dec. 1, 2014

(65) Prior Publication Data

US 2015/0168030 A1 Jun. 18, 2015

Related U.S. Application Data

(60) Provisional application No. 61/917,025, filed on Dec. 17, 2013.

(51) Int. Cl.
*F25B 21/00* (2006.01)
*F16K 5/00* (2006.01)

(52) U.S. Cl.
CPC ........ *F25B 21/00* (2013.01); *F25B 2321/002* (2013.01); *Y02B 30/66* (2013.01)

(58) Field of Classification Search
CPC .............. F25B 21/00; F25B 2321/002; F25B 2321/0022; F25B 2321/0023; F25B 2309/006; F25B 2600/2515; F16K 5/00; F16K 5/0694; Y02B 30/66
See application file for complete search history.

(56) References Cited

U.S. PATENT DOCUMENTS

| | | | |
|---|---|---|---|
| 4,332,135 A | 6/1982 | Barclay et al. | |
| 4,702,090 A | 10/1987 | Barclay et al. | |
| 4,901,047 A | 2/1990 | Wipf | |
| 4,956,976 A | 9/1990 | Kral et al. | |
| 5,182,914 A | 2/1993 | Barclay et al. | |
| 5,249,424 A | 10/1993 | DeGregoria et al. | |
| 5,934,078 A | 8/1999 | Lawton et al. | |
| 6,526,759 B2 | 3/2003 | Zimm et al. | |
| 6,668,560 B2 * | 12/2003 | Zimm | F25B 21/00 62/3.1 |

(Continued)

FOREIGN PATENT DOCUMENTS

| | | |
|---|---|---|
| KR | 1020070078484 A | 1/2007 |
| KR | 1020130108765 A | 7/2013 |

OTHER PUBLICATIONS

Gschneidner et al.; "Thirty years of near room temperature magnetic cooling: Where we are today and future prospects", Int. J. of Refrig. 31: 945-961, 2008. US.

(Continued)

*Primary Examiner* — Frantz Jules
*Assistant Examiner* — Erik Mendoza-Wilkenfe
(74) *Attorney, Agent, or Firm* — Boyle Fredrickson S.C.

(57) ABSTRACT

A magnetic refrigeration system provides flow-balanced channels between fluid control valves and the magnetocaloric beds to eliminate inefficiencies caused by unequal utilization of the magnetic beds from flow variations.

16 Claims, 11 Drawing Sheets

(56) References Cited

U.S. PATENT DOCUMENTS

| | | | |
|---|---|---|---|
| 6,826,915 B2 | 12/2004 | Wada et al. | |
| 6,946,941 B2 | 9/2005 | Chell | |
| 7,038,565 B1 | 5/2006 | Chell | |
| 7,148,777 B2 | 12/2006 | Chell et al. | |
| 8,448,452 B2 | 5/2013 | Lee | |
| 2004/0024392 A1* | 2/2004 | Lewis | A61B 18/02 606/22 |
| 2006/0118066 A1* | 6/2006 | Martins | F01P 7/165 123/41.08 |
| 2012/0285179 A1* | 11/2012 | Morimoto | F25B 41/04 62/3.1 |
| 2013/0298571 A1* | 11/2013 | Morimoto | B60H 1/32 62/3.1 |
| 2013/0327062 A1* | 12/2013 | Watanabe | F25B 21/00 62/3.1 |
| 2014/0165595 A1 | 6/2014 | Zimm et al. | |

OTHER PUBLICATIONS

Engelbrecht et al.; "Recent Developments in Room Temperature Active Magnetic Regenerative Refrigeration", HVAC&R Research, 13(4): 525-542, 2007. US.

International Search Report & the Written Opinion; International Application No. PCT/US2014/068514, dated Dec. 4, 2014.

\* cited by examiner

Fig. 6 (check valves, cold side)

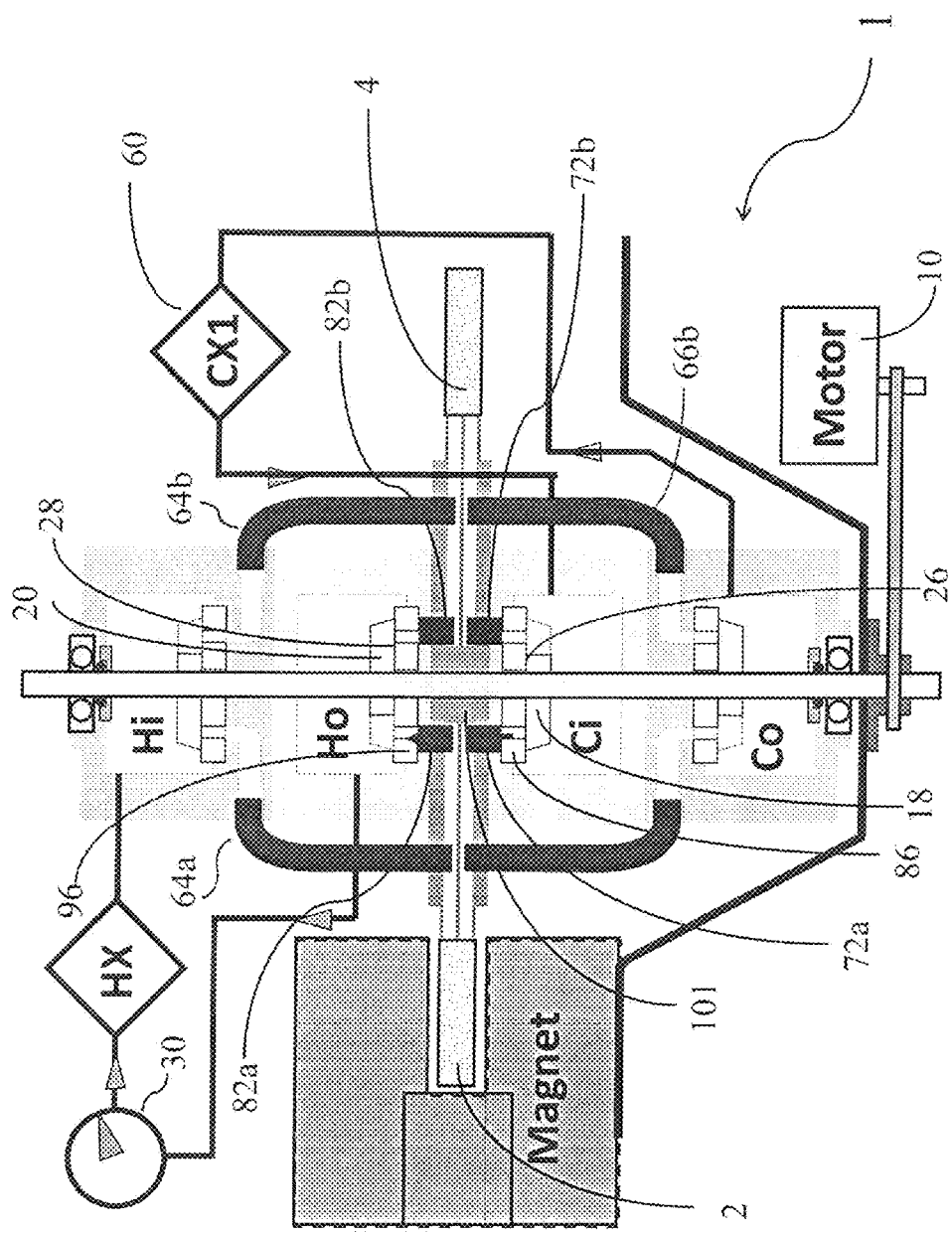
Fig. 10 (unequal blows)

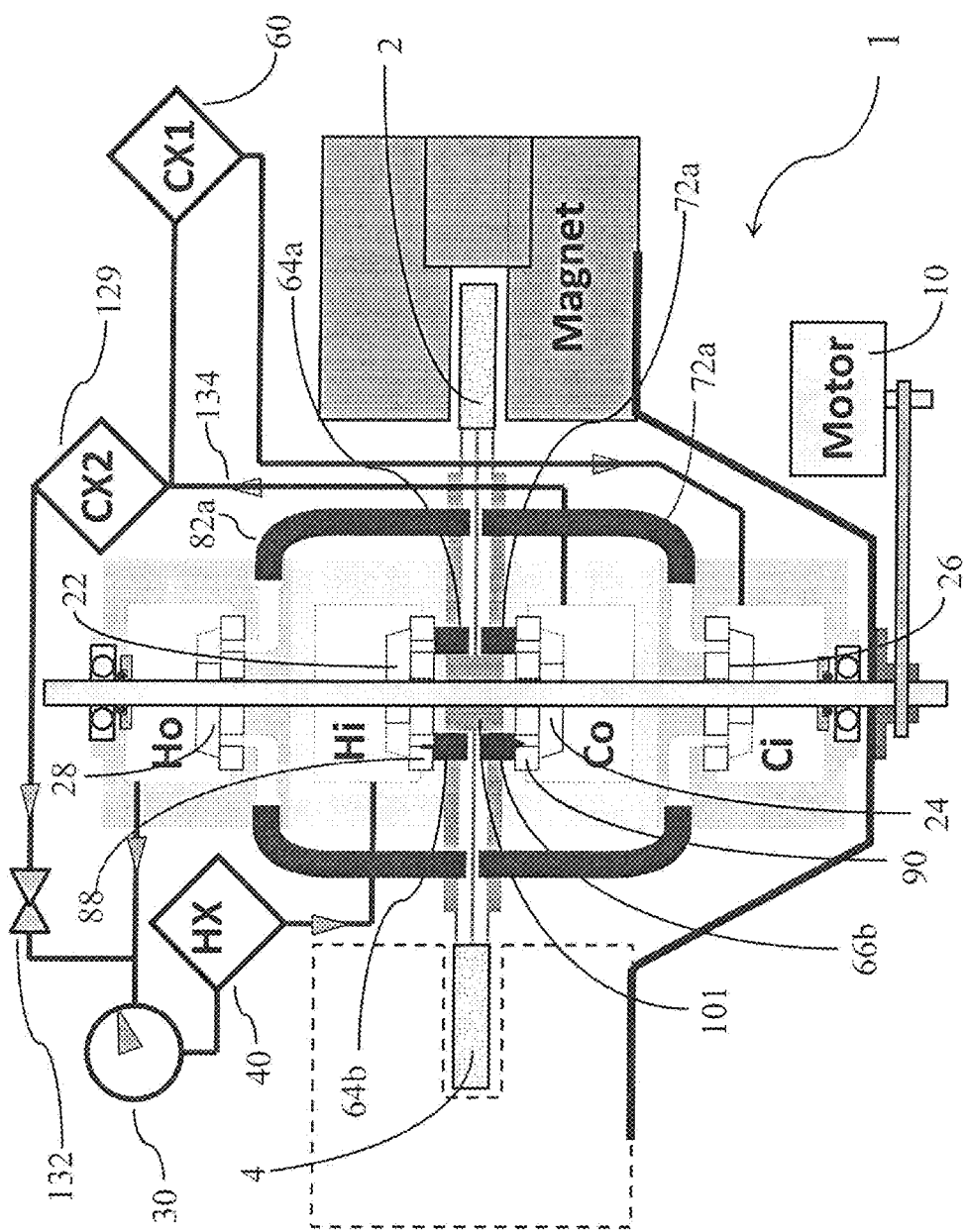
Fig. 11 (unbalanced flow)

MAGNETIC REFRIGERATION SYSTEM WITH IMPROVED FLOW EFFICIENCY

CROSS REFERENCE TO RELATED APPLICATION

This application claims priority to U.S. provisional application Ser. No. 61/917,025, filed Dec. 17, 2013, the entire contents of which is incorporated herein by reference.

STATEMENT REGARDING FEDERALLY SPONSORED RESEARCH OR DEVELOPMENT

Background of the Invention

Magnetic refrigeration (MR) is an emerging cooling technology that is based on the magnetocaloric effect, a property exhibited by certain materials which heat up when placed in a magnetic field and cool down when the field is removed. Magnetic refrigeration offers a number of distinct advantages over vapor compression, which is currently the most widely used method for cooling. First, MR uses no hydrofluorocarbons (HFCs), chlorofluorocarbons (CFCs), nor any other gaseous materials; the refrigerant in the MR system is in the form of a porous solid. The absence of any gases greatly reduces the potential for leaks, a common problem in vapor compression systems. As a result, MR systems can have greater reliability with reduced maintenance and downtime. The elimination of HFCs and CFCs has benefits for the environment, as these gases are ozone-depleting and contribute to global warming. Finally, theoretical studies demonstrate that MR systems can be more energy-efficient than vapor compression systems, particularly under off-peak load conditions.

General background on magnetic refrigeration may be found at K. Gschneidner and V. Pecharsky, "Thirty years of near room temperature magnetic cooling: Where we are today and future prospects", Int. J. of Refrig. 31: 945-961, 2008 and K. Engelbrecht, G. Nellis, S. Klein, and C. Zimm, "Recent Developments in Room Temperature Active Magnetic Regenerative Refrigeration", HVAC&R Research, 13(4): 525-542, 2007. Modern room temperature MR systems implement the so-called Active Magnetic Regenerator (AMR) cycle to perform cooling, as disclosed in U.S. Pat. No. 4,332,135, hereby incorporated by reference. This cycle has four stages, as shown schematically in FIGS. 1A, 1B, 1C, and 1D. The MR system in these figures consists of a porous bed of magnetocaloric material (MCM) 190 and a heat transfer fluid which exchanges heat with the MCM as it flows through the bed 190. The left side of the bed 190 is the cold side, while the hot side is on the right side. The timing and direction (hot-to-cold or cold-to-hot) of the fluid flow is coordinated with the application and removal of the magnetic field 192. In the first stage of the cycle ("magnetization"), FIG. 1A, while the fluid in the bed 190 is stagnant, a magnetic field 192 is applied to the MCM causing it to heat. In the next stage (the "hot blow"), FIG. 1B, while the magnetic field 192 over the bed 190 is maintained, fluid at a temperature $T_{Ci}$ (the cold inlet temperature) is pumped through the bed from the cold side to the hot side though the cold inlet 182. This fluid pulls heat from the MCM in the bed and rises in temperature as it passes through the bed 190. During the hot blow, the fluid exits the bed 190 at the temperature $T_{Ho}$ (the hot outlet temperature) through the hot outlet 186 and is circulated through a hot-side heat exchanger 194, where it gives up heat to the ambient environment and returns to the temperature $T_{Hi}$ (the hot inlet temperature)<$T_{Ho}$. In the next stage ("demagnetization"), FIG. 1C, the fluid flow is terminated and the magnetic field is removed. This causes the bed 190 to cool further. In the final stage (the "cold blow"), FIG. 1D, fluid at a temperature $T_{Hi}$ is pumped through the bed 190 from the hot side via the hot inlet 188 to the cold side in the continued absence of the magnetic field. The fluid is cooled as it passes through the MCM in the bed 190, reaching a temperature $T_{Co}$ (the cold outlet temperature)<$T_{Ci}$. The colder fluid exiting the bed 190 during the cold blow via the cold outlet 184 is circulated through a cold-side heat exchanger 196, picking up heat from the refrigerated environment. The fluid exits the cold-side heat exchanger 196 at temperature $T_{Ci}$ and completes the AMR cycle. The heat absorbed by the cold fluid in the cold-side heat exchanger 196 during the cold blow allows the refrigerated environment to maintain its colder temperature.

Although FIGS. 1A, 1B, 1C and 1D illustrate the operation of a single-bed MR system, one of ordinary skill in the art would see that multiple beds, each undergoing the same AMR cycle, may be combined in a single system to increase the cooling power, reduce the system size, or otherwise improve the performance of the cycle.

To implement the AMR cycle, a magnetic refrigerator needs one or more porous beds of magnetocaloric material, a heat transfer fluid, a pump to drive the fluid through the beds, a means for applying and removing a magnetic field to the beds, and a flow control system which coordinates the timing and direction of the fluid flow through a bed with the application and removal of the magnetic field over the bed. In one implementation of the AMR cycle in a magnetic refrigerator, a magnet assembly with a gap, such as that disclosed in U.S. Pat. No. 7,148,777, hereby incorporated by reference, rotates over fixed beds of magnetocaloric material. The fixed beds fit into the gap of the magnet assembly and the magnetic field is applied to a given bed when the magnet assembly gap rotates over it. The field is maintained over the bed as it remains within the magnet gap. As the magnet rotates away from the given bed, the magnetic field is removed. This implementation, referred to as a "rotating magnet" magnetic refrigerator or RMMR, is described in U.S. Pat. No. 6,668,560, hereby incorporated by reference.

Each bed in an RMMR has four fluid ports, as shown in FIGS. 1A, 1B, 1C and 1D. Two of these ports, the hot inlet port 188 and the hot outlet port 186, are located on the hot side of the bed 190, while two other ports, the cold inlet port 182 and cold outlet port 184, are located on the cold side of the bed 190. The inlet ports 188 and 182 deliver fluid to the magnetocaloric material in the bed 190, while the outlet ports 186 and 184 collect fluid emerging from the magnetocaloric material. By using separate inlet and outlet ports, the mixing of inlet and outlet fluid streams, which are generally at different temperatures, is minimized. This improves MR system performance by preventing the thermal loss associated with mixing.

Generally, to control the fluid flow, the RMMR uses four valves, referred to as the hot inlet (Hi) valve, the hot outlet (Ho) valve, the cold inlet (Ci) valve, and the cold outlet (Co) valve. When a bed is within the gap of the rotating magnet assembly, the cold inlet valve delivers flow to the cold inlet port of the bed; simultaneously, the hot outlet valve collects fluid from the hot outlet port of the bed. The hot inlet valve blocks flow to the hot inlet port of the bed, while the cold outlet valve blocks flow from the cold outlet port. In this manner, flow can only proceed through the bed from the cold inlet port to the hot outlet port, the desired flow path for a magnetized bed undergoing the hot blow stage of the AMR cycle. When the magnet rotates away from the bed, so that the bed is now demagnetized, the cold inlet valve now blocks flow from entering the cold inlet port, while the hot outlet valve blocks flow from emerging through the hot outlet port. The hot inlet valve opens and directs hot inlet fluid to the hot inlet port of the bed, while the cold outlet valve opens, allowing fluid to exit the bed through the cold outlet port. In this manner, flow can only proceed through the bed from the hot inlet port to the cold outlet port, the desired flow path for a demagnetized bed undergoing the cold blow stage of the AMR cycle. It is clear that for the proper functioning of the MR system, the opening and closing of the valves must be coordinated with the angular position of the magnet assembly relative to a bed.

Rotary valves, such as those disclosed in U.S. Pat. No. 6,668,560, hereby incorporated by reference, may be used for implementing the flow control described above. Generally, rotary valves employ two elements, a stator containing an annular arrangement of holes and a rotor containing a slot, extending over a certain angular distance. The rotor slot is centered over the same path as the holes in the stator, so that the slot of the rotor overlaps one or more of the holes in the stator. When the rotor slot overlaps a stator hole, a continuous fluid path is established through the valve; when the rotor slot does not overlap a stator hole, flow cannot proceed through the valve and flow is blocked. The contact faces of the rotor and stator are typically highly polished, so that no fluid can leak between them. In the valve, the stator has a plurality of ports. Each of these valve ports is connected to a fluid conduit (e.g., a pipe), the other end of which is connected to a bed port. Each hole in the stator is connected to one of these valve ports. Another end of the chamber contains a single axial port, which is connected to a fluid conduit (e.g., a pipe). The other end of this conduit is connected to a heat exchanger. The rotor is attached to a rotary shaft which rotates the rotor with respect to the stator. When the rotor is positioned so that its slot overlaps a stator hole, then a continuous fluid path is provided between a bed port on one side of the valve and the heat exchanger on the other side; otherwise, flow to or from the bed port is blocked. As the rotor rotates, the slot alternately allows and blocks flow from or to the bed port. The position of the rotor in the cold inlet valve is set so that when a bed is within the gap of the magnet assembly, the rotor slot overlaps the hole connected to the cold inlet port of the bed (through the associated cold inlet valve port). The position of the rotor in the hot outlet valve is set so that at this same time, its rotor slot overlaps the hole connected to the hot outlet bed port (through the associated hot outlet valve port). In this manner, a continuous fluid path from the cold-side heat exchanger, through the bed from its cold inlet port to its hot outlet port, to the hot-side heat exchanger, is established. The angular extent of the rotor slots is chosen so that holes in the cold inlet and hot outlet valves remain uncovered as long as the bed remains within the gap of the magnet assembly. The positions of the rotors in the hot inlet and cold outlet valves are set so that the holes connecting to the hot inlet and cold outlet ports of the magnetized bed are blocked.

With the valves and magnet assembly driven off the same motor, the rotors will rotate in exact coordination with the magnet assembly. In particular, as the magnet assembly rotates away from a given bed so that the bed becomes demagnetized, the rotors in the cold inlet and hot outlet valves will now block the holes connected to the cold inlet and hot outlet ports of the bed. The rotors in the hot inlet and cold outlet valves rotate so that the rotor slots uncover the holes connected to the hot inlet and cold outlet ports of the now demagnetized bed. Thus, flow is established from the hot-side heat exchanger, through the demagnetized bed from its hot inlet to its cold outlet, to the cold-side heat exchanger.

In existing RMMRs, and as described in U.S. Pat. No. 6,668,560, hereby incorporated by reference, the four valves are placed at four positions outside of the sweep of the magnet assembly, and the valve shafts are driven by the magnet assembly shall through belts and pulleys which connect the valve shafts to the magnet assembly shaft, which is in turn driven by a motor. In contrast, in the current invention, the valves are located coaxial with the magnet assembly shaft on each side of the magnet assembly, so that the valves can be directly driven by the magnet assembly shaft.

SUMMARY OF THE INVENTION

The present inventor has determined that substantial inefficiencies can arise in conventional magnetic refrigeration systems as a result of variations in the length, configuration and construction of the inter-communicating conduits used to conduct fluid within the complex circuits of the device. These variations can significantly underutilize the magnetocaloric beds reducing efficiency. Accordingly, the present invention provides a magnetic refrigeration system in which the conduits between the valve system and the magnetocaloric beds are balanced with respect to flow either when multiple conduits are active or over successive intervals of conduit activation. A rotary design with concentric positioning of the valves facilitates this balancing which considers not only steady-state resistance to flow but also dynamic effects caused by variations in conduit volume and/or elasticity.

In one embodiment, the invention provides a magnetic refrigeration system having at least a first and second bed of magnetocaloric material, each bed having a first and second opposed side between which fluid may flow. At least one manifold communicates a hot inlet conduit and a hot outlet conduit to the first side of each bed and communicates a cold inlet conduit and a cold outlet conduit to the second side of each bed. A magnet assembly is movable to apply a greater magnetic field to the first bed than the second bed in a first state and a greater magnetic field to the second bed than the first bed in a second state, and a valve system communicates with the conduits and synchronizes to the magnet assembly to permit circulation of fluid through the first and second beds to remove heat from the first bed by providing flow through at least one first conduit pair (each pair being a series-connected cold inlet conduit and hot outlet conduit) and to add heat to the second bed in the first state by providing flow through at least one second conduit pair (each pair being a series-connected hot inlet conduit and cold outlet conduit). Each of the first and second conduit pairs are adapted to provide substantially equal fluid flow through each first conduit pair when connected for flow by the valve system.

It is thus a feature of at least one embodiment of the invention to address cooling inefficiencies that can result from relatively minor flow imbalances.

Each first conduit pair may have substantially equal flow resistance and each second conduit pair has substantially equal flow resistance. In this respect, each first and second conduit pair may have a substantially identical length.

It is thus a feature of at least one embodiment of the invention to balance flow resistances in the conduit such as affects steady-state flow.

The conduit pairs carrying greater flow may be made shorter than conduit pairs carrying lesser flow.

It is thus a feature of at least one embodiment of the invention to provide a system that may be better tailored to permitting an equal flow in the hot and cold cycle portions.

Alternatively or in addition, each first and second conduit pair may have substantially equal internal volume.

It is thus a feature of at least one embodiment of the invention to address flow imbalances caused by dynamic "inductive" effects related to the inertial mass of flowing material in the conduit pairs.

Alternatively or in addition, each conduit pair has substantially equal change in internal volume as a function of change in pressure.

It is thus a feature of at least one embodiment of the invention to compensate for flow imbalances caused by dynamic "capacitive" effects related to the elasticity of the conduit.

The change in internal volume of each conduit pair to a bed of magnetocaloric material, when subjected to the increase from a minimum to a maximum fluid pressure during the operation of the magnetic refrigeration system, may be less than 5% of the total fluid volume delivered to a single bed during the time interval in one AMR cycle that the conduit pair is delivering flow to that bed.

It is thus a feature of at least one embodiment of the invention to limit potential backflow and inefficiencies caused by stored pressure in possibly elastic conduits.

Each of the hot inlet conduits, hot outlet conduits, cold inlet conduits, and cold outlet conduits may be adapted to provide substantially equal resistance to fluid flow.

It is thus a feature of at least one embodiment of the invention to provide balanced resistance according to the function of the conduit.

The valve system may provide four valves including a hot outlet valve, a hot inlet valve, a cold outlet valve and a cold inlet valve, wherein in the first state, the hot outlet valve connects the hot outlet conduit of the first bed to the inlet of a hot heat exchanger and the cold inlet valve connects the cold inlet conduit of the first bed to an outlet of a cold heat exchanger and the hot inlet valve connects the hot inlet conduit of the second bed to an outlet of the hot heat exchanger and the cold outlet valve connects the cold outlet conduit of the second bed to an inlet of the cold heat exchanger. And further wherein in the second state the hot outlet valve connects the hot outlet conduit of the second bed to the inlet of the hot heat exchanger and the cold inlet valve connects the cold inlet conduit of the second bed to the outlet of the cold heat exchanger and the hot inlet valve connects the hot inlet conduit of the first bed to the outlet of the hot heat exchanger and the cold outlet valve connects the cold outlet conduit of the first bed to the inlet of the cold heat exchanger.

It is thus a feature of at least one embodiment of the invention to provide for balanced flow in a system that preserves unidirectional flow through each conduit to eliminate losses from backflow.

The hot outlet valve and the hot inlet valve may include movable elements opening and closing the valves and in mechanical communication with the magnet assembly, and wherein the cold inlet valve and cold outlet valve are one-way valves actuated by fluid flow. Alternatively, the cold outlet valve and the cold inlet valve may include movable elements opening and closing the valves and in mechanical communication with the magnet assembly, and wherein the hot inlet valve and hot outlet valve may be one-way valves actuated by fluid flow It is thus a feature of at least one embodiment of the invention to simplify the valve structures by using some one-way type valves.

The first and second bed may be arranged around a central axis and the magnet assembly may be attached to a shaft rotatable with respect to the first and second bed along the central axis and the hot outlet valve and hot inlet valve may be disk valves having rotor portions attached coaxially about the shaft to move with respect to stationary stator portions positioned coaxially about the shaft.

It is thus a feature of at least one embodiment of the invention to employ an axially balanced rotating architecture to facilitate balancing of the conduit structure.

The hot outlet valve and hot inlet valve may have stator portions fixed with respect to the beds and rotor portions fixed with respect to the magnet wherein the stator portions are mounted between the rotor portions.

It is thus a feature of at least one embodiment of the invention to adopt a valve orientation and inherent sealing between the valve rotor and stator to balance the forces necessary to seal the rotors to the stators.

The magnetic refrigeration system may include a plurality of magnetic beds arranged about the central axis, each having a manifold communicating a hot inlet conduit and a hot outlet conduit to the first side of each bed and communicating a cold inlet conduit and cold outlet conduit to the second side of each bed wherein the valve assembly provides valves attached to the shaft communicating with either inlet conduits or outlet conduits.

It is thus a feature of at least one embodiment of the invention to provide balanced flow in a multibed system where inefficiencies from unbalanced flow may be aggravated.

The valves may provide substantially unobstructed communication with multiple inlet conduits or outlet conduits at one or more positions of the shaft.

It is thus a feature of at least one embodiment of the invention to ensure equal flow sharing among conduits when multiple conduits are operated in parallel.

The magnetic refrigeration system may further include a positive displacement pump circulating the fluid through the valve system and inlet and outlet conduits.

It is thus a feature of at least one embodiment of the invention to provide a pump that can handle quick changes in flow rate necessary for switching among multiple beds and to provide a conduit system compatible with this rapid switching.

These particular objects and advantages may apply to only some embodiments falling within the claims and thus do not define the scope of the invention.

BRIEF DESCRIPTION OF THE DRAWINGS

FIG. 10 is a figure similar to that of FIG. 5, but showing a system providing unequal blows; and FIG. 11 is a figure similar to FIG. 5 showing a system for unbalanced flow.

DETAILED DESCRIPTION OF THE INVENTION

Figure 1A:
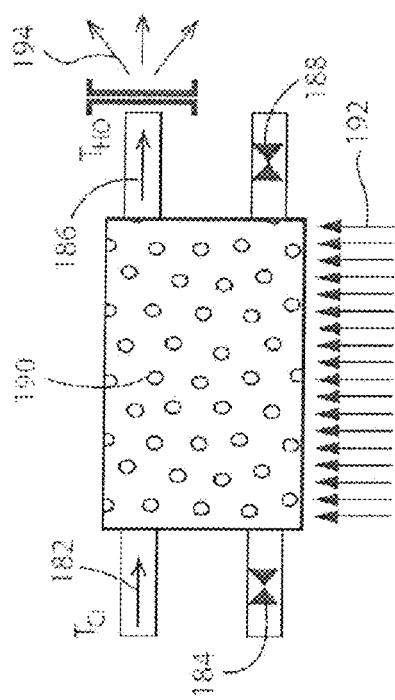
FIGS. 1a-1d are schematics illustrating an Active Magnetic Regenerator (AMR) cycle to perform cooling.
Figure 1B:
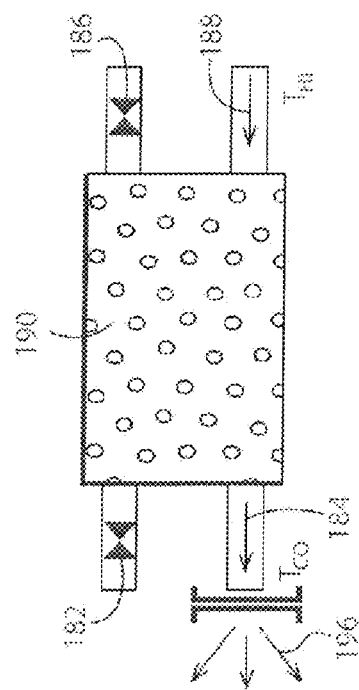
Figure 1C:
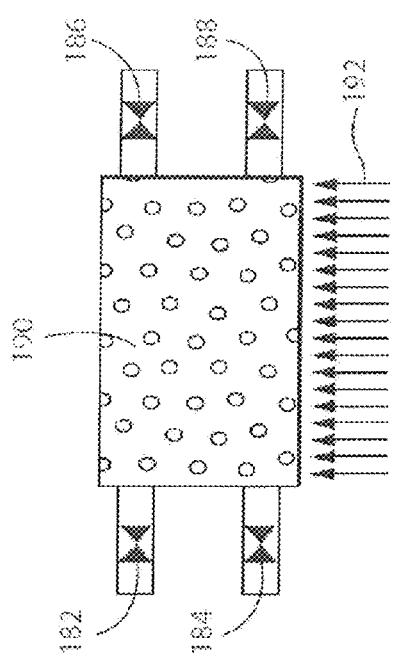
Figure 1D:
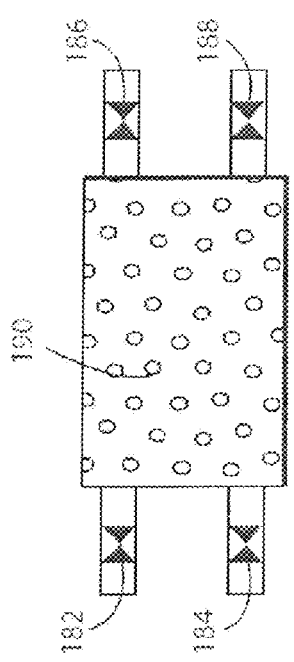
Figure 2:
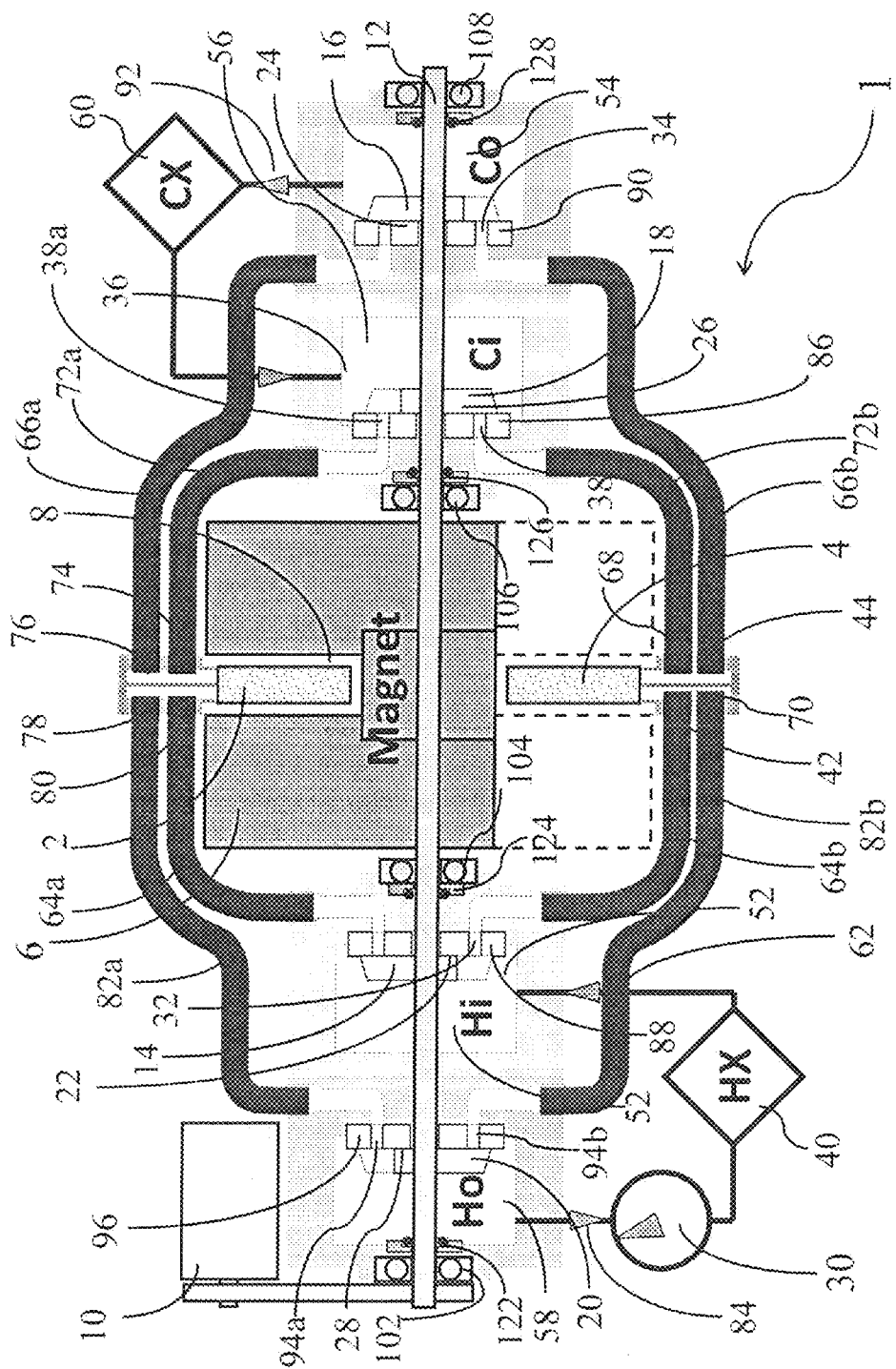
FIG. 2 shows a first embodiment of the invention with four disk valves.

The invention comprises a "rotating magnet" magnetic refrigerator (RMMR) which uses rotary disk valves to control flow to and from the beds where these valves are located coaxially with the shaft rotating the magnet assembly. A first embodiment of this invention is shown in FIG. 2. FIG. 2 shows a cross section of a two-bed system 1, where a first bed 2 (magnetized) is within the gap 8 of the magnet assembly 6 while a second bed 4 (demagnetized) is outside the gap 8 of the assembly. A motor 10 (which may be an electric motor) rotates the central shaft 12, which is mounted to bearings 102, 104, 106 and 108, and passes through rotary seals 122, 124, 126 and 128. This central shaft 12 also drives the rotors 14, 16, 18, 20 in each of the coaxial valves 22, 24, 26, 28. A pump 30 drives fluid flow through the system 1.

In the configuration shown in FIG. 2, the rotor 14 in the hot inlet (Hi) valve 22 uncovers the hole 32 connected to the hot inlet port 42 of the demagnetized (lower) bed 4. At the same time, the rotor 16 in the cold outlet (Co) valve 24 uncovers the hole 34 connected to the cold outlet port 44 of the bed 4. Thus, pressurized fluid emerging from the hot-side heat exchanger (HHEX) 40 at temperature $T_{Hi}$ is carried by a pipe 62 into a chamber 52 at one end of the hot inlet valve 22, through the uncovered hole 32 in stator 88 of the hot inlet valve 22 and is driven into a hot inlet pipe 64b and through the bed 4 from its hot inlet port 42 to its cold outlet port 44. After passing through the cold (demagnetized bed) 4, this fluid, now at temperature $T_{Co}$, is carried by a cold outlet pipe 66b and collected by the open cold outlet valve 24 through the hole 34 in the stator 90, and directed via the chamber 54 at one end of the valve 24 through pipe 92 to the cold-side heat exchanger (CHEX) 60 where the fluid absorbs heat from the refrigerated environment and rises in temperature to $T_{Ci}$. The cold inlet port 68 and cold inlet pipe 72b of the demagnetized bed 4 are blocked by the rotor 16 position in the cold inlet (Ci) valve 26 covering the hole 38b, and the hot outlet port 70 and hot outlet pipe 82b of the demagnetized bed 4 are also blocked by the rotor 20 position in the hot outlet (Ho) valve 28 covering the hole 94b. Fluid at temperature $T_{Ci}$ emerging from the other end of the cold-side heat exchanger 60 enters the single port 36 in the chamber 56 at one end of the cold inlet valve 26. This fluid is directed through the cold inlet rotor 18 and through the hole 38a in the stator 86 into a cold inlet pipe 72a and to the cold inlet port 74 of the magnetized (upper) bed 2. The fluid passes through the magnetized bed 2 from the cold inlet port 74 to the hot outlet port 78 and rises in temperature to $T_{Ho}$. Flow through the cold outlet port 76 and cold outlet pipe 66a of the bed 2 is blocked by the cold outlet valve 24. Flow through the hot inlet port 80 and hot inlet pipe 64a of the bed 2 is blocked by the hot inlet valve 22. Hot outlet fluid at temperature $T_{Ho}$ from the port 78 of the bed 2 is carried by a hot outlet pipe 82a through a hole 94a in the stator 96 into the hot outlet valve 28, exits the valve 28 via the chamber 58 and returns via a pipe 84 to the pump 30, where it gets directed through the other end of the HHEX 40, completing the flow circuit.

Although the figures show pipes that carry the fluid flow between components of the invention, any suitable conduits that carry the fluid between the components might be used. For example, the conduits might be fluid passages in an injection-molded assembly, or the conduits might be fluid passages in an assembly made by additive manufacturing, or the conduits could be pipes as shown in the drawings.

Figure 3:
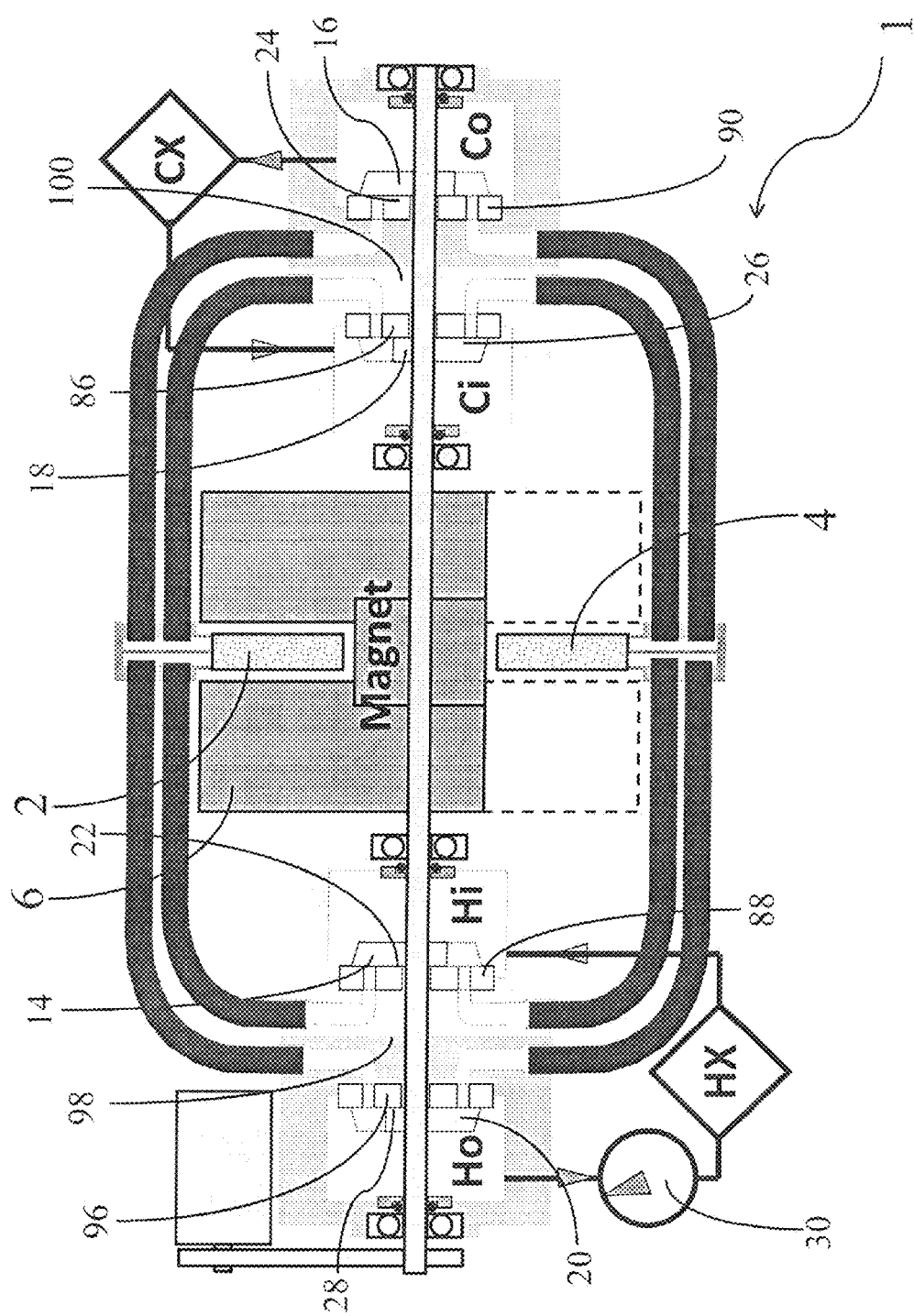
FIG. 3 shows a second embodiment of the invention with stators for the hot inlet valve and the hot outlet valve mounted to a common assembly.

A second embodiment of this invention is shown in FIG. 3. The second embodiment has the same components as the first embodiment, and the components perform the same functions in the same manner as the first embodiment. The difference is that the stator 86 and rotor 18 of the cold inlet valve 26 are inverted left to right, and the stator 88 and rotor 14 of the hot inlet valve 22 are inverted left to right, allowing the stator 88 for the hot inlet valve 22 and the stator 96 for the hot outlet valve 28 to be mounted to a common assembly 98; the stator 86 for the cold inlet valve 26 and the stator 90 for the cold outlet valve 24 also can be mounted to a common assembly 100. The magnet assembly 6, the beds 2, 4, and the pump 30 are in similar positions in the first and second embodiments.

By mounting the stators 88 and 96 on opposed walls, the forces needed to compress the rotors 14 and 20 to their stators 88 and 96 are counter-acting, and the forces needed to compress the rotors 16 and 18 to their stators 90 and 85 are counteracting, thus reducing loads on the shaft 12 and simplifying the design.

Figure 4:
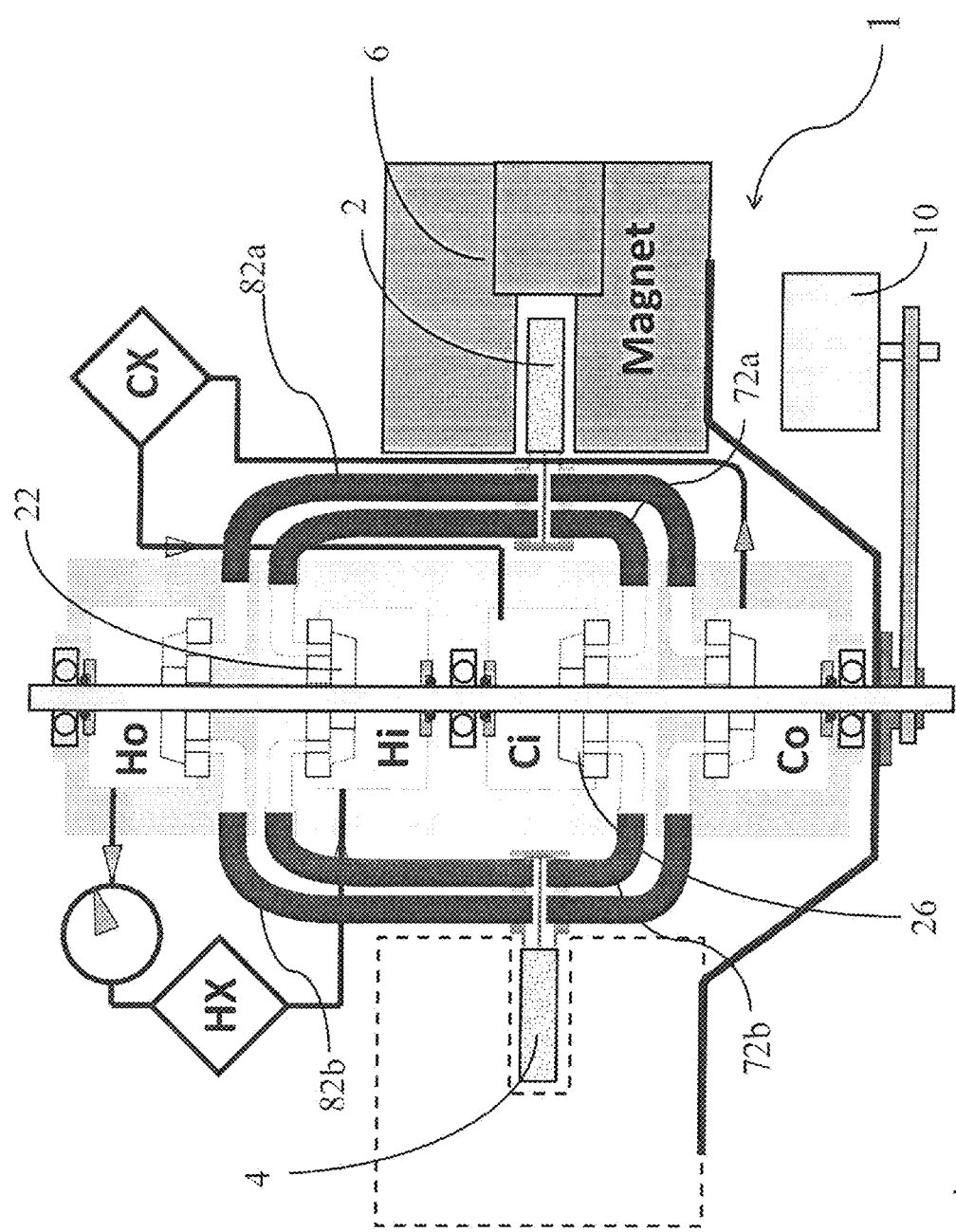
FIG. 4 shows a third embodiment of the invention with the magnet at a larger radius.

A third embodiment of this invention is shown in FIG. 4. The third embodiment has the same components as the second embodiment, and the components such as the motor 10 perform the same functions in the same manner as the second embodiment. The difference is that magnet assembly 6 and beds 2, 4 in the first and second embodiments are located between the hot inlet valve 22 and cold inlet valve 26 at a similar radius, while the magnet assembly 6 and beds 2 and 4 of the third embodiment are located outside the valves 22, 26 at a larger radius, allowing the length of the assembly 1 to be reduced. Note that in FIG. 4, the hot outlet pipes 82a, 82b are each the same length and shape, and the cold inlet pipes 72a, 72b are also each the same length and shape, although the hot outlet pipe 82a is a different length and shape from the cold inlet pipe 72a.

In FIGS. 2, 3, and 4, all the pipes of the same function, such as hot outlet, are the same length, although pipes of different function, such as hot outlet and cold inlet, may be of different length. More generally, conduit pairs, such as cold inlet pipe 72a in series with and hot outlet pipe 82a, and cold inlet pipe 72b in series with hot outlet pipe 82b (first conduit pairs), or being hot inlet pipe 64a in series with cold outlet pipe 66a and hot inlet pipe 64b in series with cold outlet pipe 66b (second conduit pairs), are configured for equal or balanced flow among all similar conduit pairs. This is provided by ensuring that the conduit pairs provide equal steady-state flow resistance, but also by addressing dynamic factors such as flow inductance by setting equal the total internal volume of the conduit pairs, and flow capacitance by ensuring that the change in internal volume with changes in pressure is equal for the conduit pairs. These values may also be identical but need not be identical when the first conduit pairs are compared to the second conduit pairs.

Figure 5:
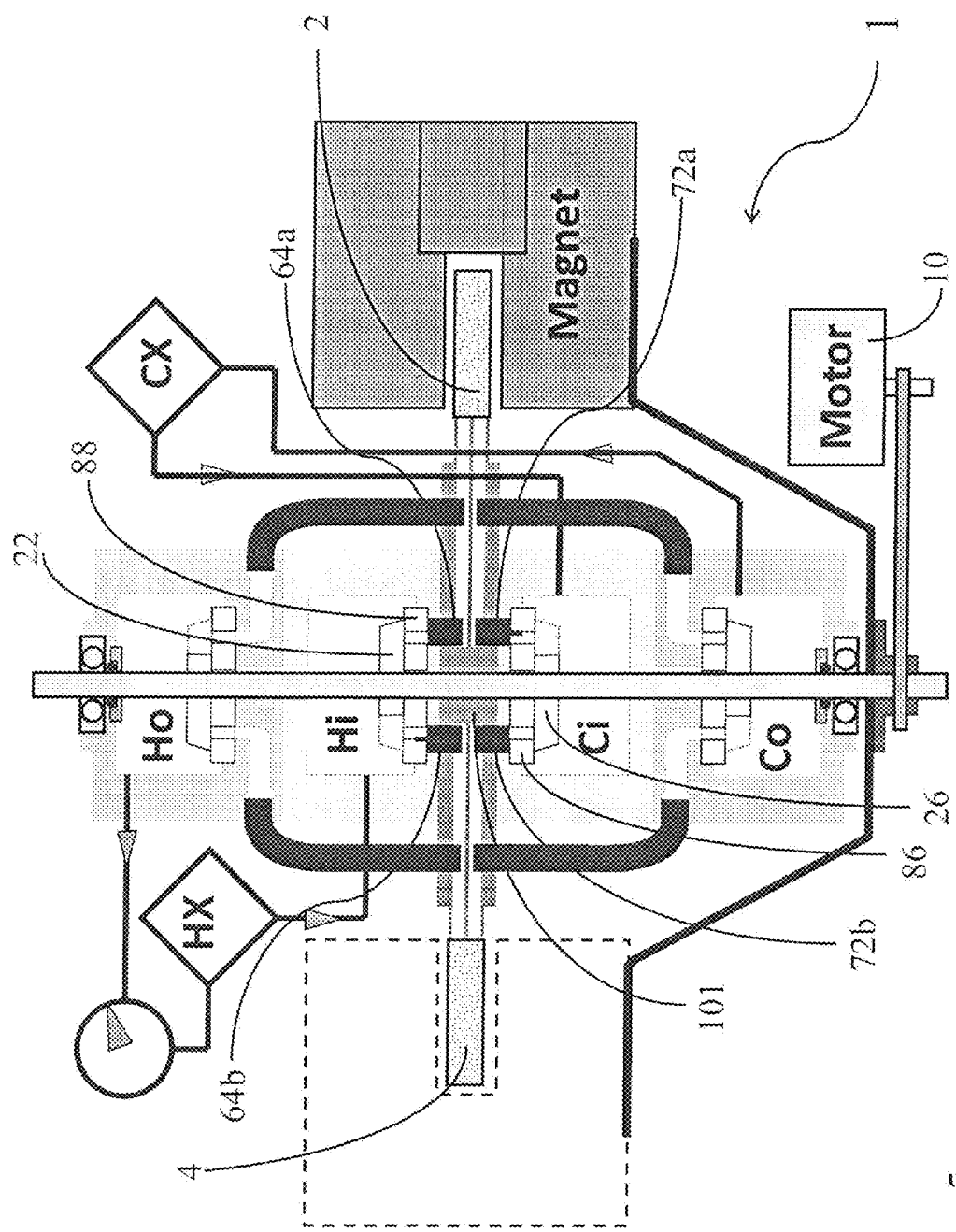
FIG. 5 shows a fourth embodiment of the invention with stators of the hot inlet and cold inlet valves mounted to a common assembly.

A fourth embodiment of this invention is shown in FIG. 5. The fourth embodiment has the same components as the third embodiment, and the components such as the motor 10 perform the same functions in the same manner as the third embodiment. The difference is that the stators 88, 86 of the hot inlet 22 and cold inlet 26 valves are mounted to a common assembly 101, allowing for shorter hot inlet piping 64a, 64b and cold inlet piping 72a, 72b to the beds 2, 4 than is possible for the first three embodiments.

Additional variants for the above four embodiments may be created by replacing the cold side inlet and outlet valves by one-way valves. Examples of one-way valves that might be used in the invention are check valves and reed valves. A one-way valve, also known as a check valve, allows fluid flow in only one direction and blocks fluid flow in the opposite direction. For example, a ball check valve uses a spherical ball to block the flow of fluid in one direction. A conically tapered seat will place the ball within the valve opening to prevent flow in one direction, but allow flow in the opposite direction when the ball is displaced from its seat. Placement of the ball within the seat may be aided by a spring. Other types of one-way valves include diaphragm check valves, swing check valves, tilting disc check valves, stop-check valves, lift-check valves, in-line check valves, duckbill valves, pneumatic non-return valves, etc. One-way valves can be smaller and less expensive than rotary disk valves.

Figure 6:
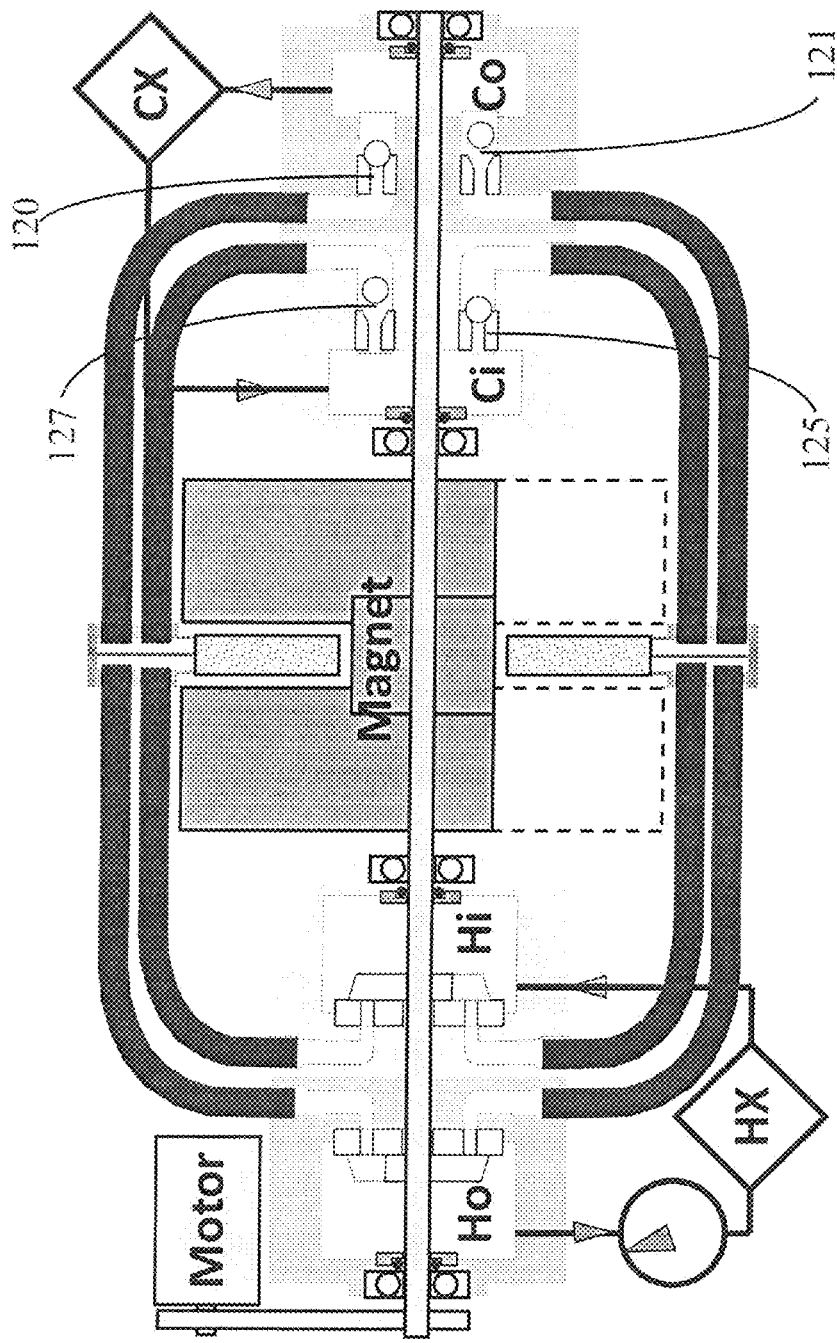
FIG. 6 shows a fifth embodiment of the invention with check valves on the cold side.

An example of a fifth embodiment using one-way valves is shown in FIG. 6, where the cold side valves 24, 26 of embodiment 2 in FIG. 3 have been replaced by check valves 120, 121, 125, and 127 in FIG. 6. Additional variants for the first four embodiments may be created by replacing the hot side inlet and outlet valves by one-way valves and moving the pump to the cold side. For example, if the pump 30 of embodiment 2 is moved to the cold side, the hot side inlet 22 and outlet 28 valves of embodiment 2 can be replaced by one-way valves, while retaining cold side disk valves 24 and 26.

Figure 7:
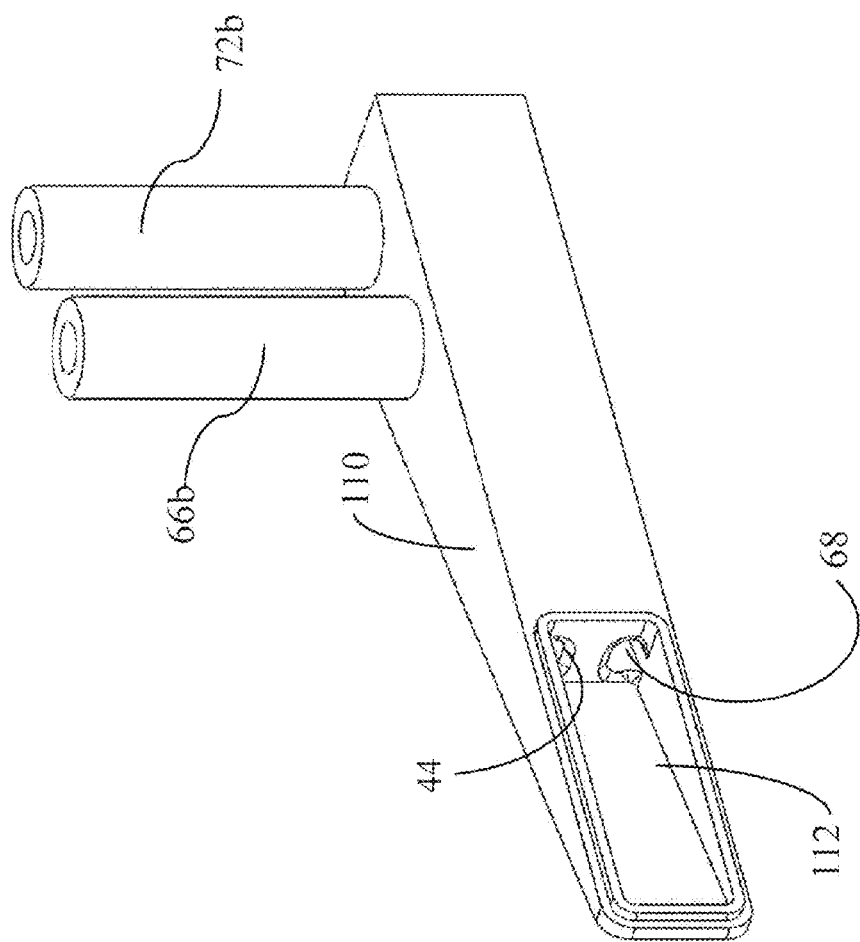
FIG. 7 shows an enlarged view of a flow connection at one side of a bed.

FIG. 7 shows details on how the connection might be made between one end of a bed and the inlet and outlet pipes coming from a valve. The cold inlet pipe 72b and cold outlet pipe 66b come in from the top of the figure and enter a bed plenum assembly 110. The cold inlet pipe 72b terminates at a cold inlet port 68 and the cold outlet pipe 66b terminates in a cold outlet port 44 that connect at a rectangular opening 112 that can be attached to one side of a bed, such as the bed 4 of FIG. 2. The bed is not shown in FIG. 7.

Although two-bed embodiments are shown in FIGS. 2 through 6, it is usually advantageous to fit additional beds in the path swept by the magnet gap. The additional beds increase the cooling power and can make more efficient use of the magnet assembly. The valves may be designed to allow flow in a given direction to multiple beds at the same time. For example, an eight-bed version of the first embodiment is shown as an end view from the cold end in FIG. 8. Not shown are the cold inlet pipes, the hot inlet and outlet pipes, the valve housings and seals, the HEX's, the pump, the motor, and the bearings. The magnet assembly 6 and the cold outlet valve rotor 16 are connected to the shaft 12 and rotate with it. The magnet assembly is shown over two magnetized beds 2a, 2b, which are both under flow from their cold ends to their hot ends. Two demagnetized beds 4a, 4b are in the lowest field region and both are under flow from their hot ends to their cold ends, and four remaining beds 3a, 3b, 3c, and 3d at intermediate fields are not under flow. Each bed is attached to a cold side plenum assembly 110 and a hot side plenum assembly 111. Together these plenums create a manifold about the bed. The cold outlet valve rotor 16 is shown exposing two holes 34a, 34b in the cold outlet valve stator 90, allowing flow to leave the demagnetized beds 4a, 4b through the cold outlet ports 44a, 44b and the cold outlet pipes 66a, 66b which are attached to the cold side plenum assemblies 110a, 110b. Meanwhile, the cold outlet valve rotor 16 is blocking the holes 34c, 34d, 34e, 34f, 34g and 34h, thereby blocking flow from the cold outlet ports of beds 2a, 2b, 3a, 3b, 3c, and 3d.

Figure 8:
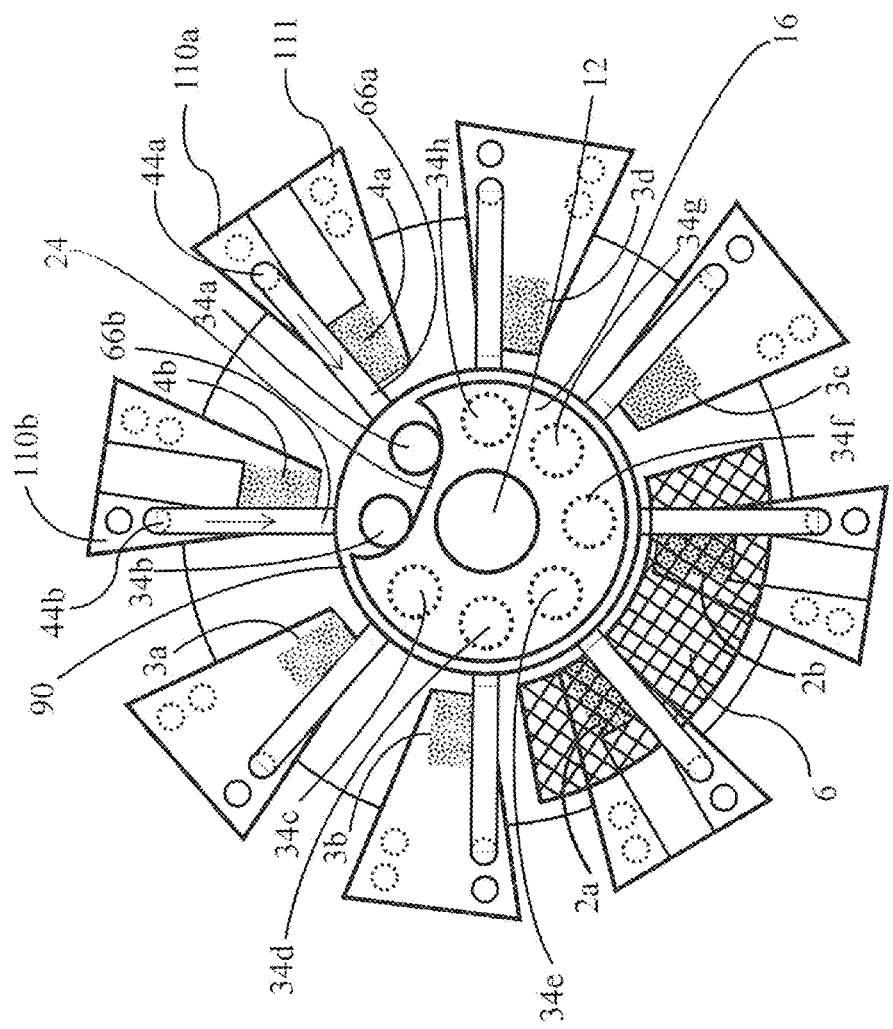
FIG. 8 shows an end view of an eight bed configuration of the second embodiment shown in FIG. 3.

Note that the flow situation of FIG. 8 can be implemented using cold inlet, cold outlet, hot inlet and hot outlet valve rotors that each expose two holes in their matching stator at a time.

Figure 9:
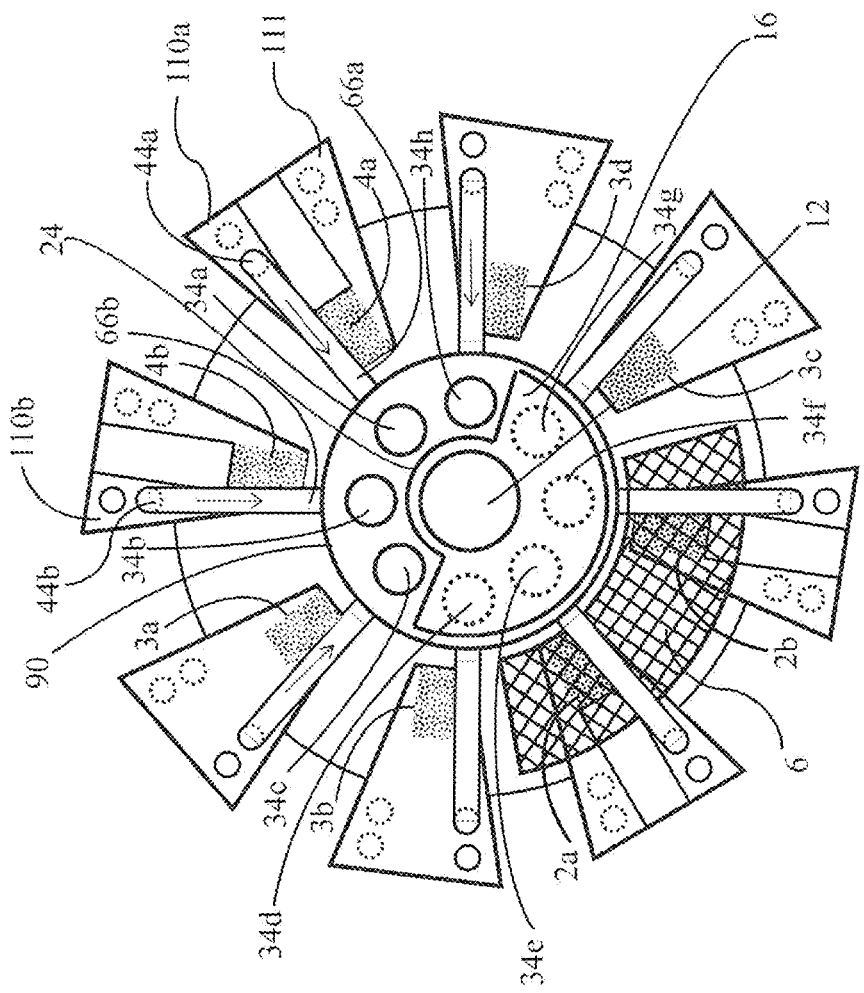
FIG. 9 is a figure similar to FIG. 8 but showing a system providing unequal blows.

Although FIG. 8 shows a situation where two beds are simultaneously under flow from cold to hot and two beds are under flow from hot to cold, there are four beds that are not under flow and thus are not contributing to the cooling of the device. If the cold outlet and hot inlet valve rotors expose more holes in their matching stators than the cold inlet and hot outlet valves, then more beds will be subjected to hot to cold flow than will be subjected to cold to hot flow. FIG. 9 shows such an arrangement, where the cold outlet valve rotor 16 exposes four holes in its stator 90, thereby allowing simultaneous hot to cold flow for the four beds 3a, 4b, 4a and 3d provided that the hot inlet valve also exposes four holes in its corresponding stator to allow the hot inlet flow to enter beds 3a, 4b, 4a and 3d. Meanwhile, if the cold inlet and hot outlet valve rotors still expose only two holes in their corresponding stators, only two beds will simultaneously undergo cold to hot flow. The additional beds 3a and 3b under hot to cold flow share some of the flow that was formerly carried only by beds 4a and 4b, thereby reducing system pressure drop and system heat transfer losses.

The magnet assemblies shown in the above embodiments are a single lobe design, with one high field region, and an opposite low field region. However, it may be advantageous to employ magnet assemblies with multiple high field regions and multiple low field regions. For such cases, co-axial disk valves could be implemented with additional slots that direct cold to hot flow simultaneously to beds in multiple high field regions, and direct hot to cold flow simultaneously to beds in multiple low field regions.

By placing the valves coaxially with the main drive shaft, the need for connecting belts and pulleys between this shaft and the valve shafts is eliminated. These belts and pulleys waste energy provided by the motor, so their elimination improves the energy-efficiency of the MR system. The belts and pulleys take up space, so their elimination also results in a smaller, more compact system.

Moreover, the coaxial valve placement reduces the length of the fluid conduits (commonly called pipes) connecting the valves and the fixed beds. Note that this invention allows the use of separate inlet and outlet pipes on both the cold and hot sides for each bed. By using separate inlet and outlet pipes with unidirectional flow in each pipe, all the fluid that enters the pipe eventually will reach the destination bed or destination heat exchanger. Thus the fluid contained in the pipes will contribute to the operation of the AMR cycle and not represent "dead volume". However, even with separate inlet and outlet pipes, the shorter pipe lengths possible with the coaxial valves still offer two advantages. First, the shorter length reduces the pressure drop experienced by the fluid as it flows through the pipe through the conduit, that is, the fluid resistance of the pipe to steady flow is reduced. This reduces the load on the pump and further improves the energy efficiency of the system. Second, the shorter pipe lengths reduce the magnitude of bypass flow, a phenomenon in which fluid bypasses the beds and proceeds directly from the hot inlet valve to the hot outlet valve. Bypass flow does not contribute to refrigeration and therefore wastes energy provided by the pump; its reduction therefore improves the energy efficiency of the MR system.

Bypass flow is caused, in part, by periodic expansion of a deformable plumbing element under pressurization, followed by fluid expulsion under depressurization, a form of fluid capacitance for the plumbing element. To explain this bypass flow mechanism, we refer to FIG. 2. The hot inlet fluid is at the highest pressure in the fluid circuit. Under this pressure, the pipe 64b connecting the hot inlet valve 22 to the hot inlet port 42 of the demagnetized bed 4 will expand slightly, storing some fluid that would otherwise pass through the bed 4. After the cold blow is completed, the Hi and Co valves 22, 24 seal off the hot inlet pipe 64b of this bed 2, preventing the stored fluid from leaving the hot inlet pipe 64b. When the valves rotate for the hot blow, the hot outlet pipe 82b connected to the bed 4 can now carry flow, so the pressurized fluid stored in the hot inlet pipe 66b can be expelled through the hot outlet pipe 82b and into the hot outlet valve 28, allowing the hot inlet pipe 64b to return to its original shape. This cyclical process of pressurization, expansion, and fluid storage during the cold blow, followed by fluid expulsion and depressurization during the following hot blow, produces bypass flow. The amount of fluid that can be stored during the cold blow increases with the length of pipe connecting the hot inlet valve to the hot inlet port of a bed. The coaxial valve placement minimizes this conduit length, minimizing the increase in fluid volume during pressurization, thus minimizing bypass flow and improving system performance. For best operation of an AMR system, the change in internal fluid volume of a conduit to a bed when subjected to the increase from the minimum to the maximum fluid pressures during the AMR cycle should be less than 5% of the total fluid volume delivered to a single bed during the time interval in one AMR cycle that the conduit pair is delivering flow to that bed.

An additional advantage of the coaxial valve arrangement is that it allows the conduits of a similar flow function connecting the beds to the valves to be symmetrically placed around the shaft axis and to be of identical shape and length. There are four flow functions for conduits connecting the beds to the valves: hot inlet, hot outlet, cold inlet, and cold outlet. Two pipes that each conduct hot inlet flow both have a similar function, although they might be connected to different beds. For an example of symmetrical placement and identical shape, in FIG. 2, if the two beds 2 and 4 shown in the figure are located at a 180 degree rotational angle from each other around the axis of the shaft 12, and the ports 38a and 38b in the cold inlet valve are also located at a 180 degree angle from each other around the same axis, then the two cold inlet pipes 72a and 72b can be identical components of identical shape and length, but mounted at a 180 degree angle from each other around the axis of the shaft 12. In addition to saving fabrication cost, the identical shape and length of conduits of a similar flow function ensures that the resistance of the conduits to steady flow will be equal. In addition, if the conduits of a similar flow function are of identical shape and length and wall thickness, then the conduits of similar function will have equal change in internal fluid volume when subjected to the increase from the minimum to the maximum fluid pressures during the AMR cycle. Finally, if the conduits of a similar flow function have the same internal cross section as well as identical shape and length, the conduits will have equal internal fluid volume, the mass of fluid stored in the conduits will be identical, and thus the dynamic pressure drop needed to accelerate fluid flow at the start of the fluid blow will be equal. The equivalent characteristics of conduits of a similar flow function thus ensure that the pressure drop due to flow friction, and the flow transient effects due to conduit expansion and fluid inertia, will be identical for all the beds. This helps ensure that all the beds get similar flow versus time profiles during an AMR cycle, which can improve efficiency and temperature span.

The flow from the hot outlet valve to the pump in the first five embodiments (FIGS. 2, 3, 4, 5 and 6) only occurs in one direction, from the valve to the pump, and is thus unidirectional flow.

Although this invention enables conduits of a similar flow function to be of equal length, conduits of dissimilar flow function, such as hot outlet and hot inlet, may be of different length. In the case where the flows in conduits of dissimilar flow function are not of the same magnitude, it may be advantageous to adopt a design where the conduits of functions that carry the highest flow rates are made the shortest. For example, in the case that was described in connection with FIG. 9, where four beds at a time undergo cold to hot flow while only two beds at a time undergo hot to cold flow, it could be advantageous to make the conduits carrying hot to cold flow shorter than the pipes carrying cold to hot flow. Note that the total hot to cold flow carried by all the beds is the same as the total cold to hot flow carried by all the beds, but because fewer beds carry cold to hot flow than carry hot to cold flow, the rate of flow in each conduit that carries cold to hot flow will be greater than the rate of flow in each conduit that carries hot to cold flow. In the sixth embodiment shown in FIG. 10, the hot outlet valve 28 and cold inlet valve 26 are mounted adjacent to one another. The hot outlet stator 96 and cold inlet stator 86 are mounted to a common assembly 101 and are positioned between the hot outlet rotor 20 and the cold inlet rotor 18. The hot inlet valve 22 and the cold outlet valve 24 are mounted outside the hot outlet and cold inlet valves, closer to the outer ends of the shaft 12. This valve arrangement allows the hot outlet conduit 82a and cold inlet conduit 72a that carry flow to the magnetized bed 2 to be much shorter than the hot inlet pipe 64b and cold outlet pipe 66b that carry flow to the demagnetized bed 4. Thus when two magnetized beds are undergoing cold to hot flow, and thus only two sets of cold inlet and hot outlet conduits must carry the flow, the conduits are short, reducing what otherwise might be a large pressure drop. Meanwhile, four demagnetized beds are undergoing hot to cold flow, and thus four sets of hot inlet, and cold outlet conduits are sharing the hot to cold flow, and thus the longer length of these conduits will not produce a large increase in pressure drop. Note that although flow conduits of different function are of different lengths, conduits of the same function can still be of the same length, so all the beds can get similar flow versus time profiles during the AMR cycle.

Turning now to FIG. 11, another magnetic refrigeration system being used as a fluid chiller is shown, in accordance with at least some embodiments of the present disclosure. Specifically, in some cooling applications (e.g. ventilation air conditioning or cooling water generation), what is desired is not the pumping of heat from a cold reservoir at $T_c$ to a hot one at $T_h$, but the cooling of an air or fluid stream from $T_h$ to $T_c$ (e.g., a "fluid chiller"). If the fluid has a temperature-independent heat capacity C, the total amount of heat $Q_C$ to be removed from the fluid is $Q_C = C(T_H - T_C)$. Additionally, the minimum theoretical work W required to move a given amount of heat $Q_c$ from a cold absolute temperature $T_c$ to a hot absolute temperature $T_h$ via a reversible refrigerator is $W = Q_C(T_H - T_C)/T_C$ where the coefficient of performance (COP) may be defined as $Q_c/W$. The theoretical minimum amount of work required to cool a fluid using a single stage refrigerator that pumps all the heat from absolute temperatures $T_c$ to $T_h$ is:

$$W = C(T_H - T_C)^2 / T_C \quad \text{Equation 1}$$

and the related COP $$COP = Q_C / W = (T_C / (T_H - T_C)). \quad \text{Equation 2}$$

Actual refrigerators may be relatively less efficient, with major losses occurring due to viscous losses in the compression and expansion of the refrigerant.

Less work may be needed if the fluid were cooled by a large number of separate refrigerators with the first cooling the fluid from $T_H$ to $T_{H-d}$ and pumping heat to $T_H$, and the next cooling the fluid from $T_{H-d}$ to $T_{H-2d}$ and pumping heat to $T_H$, etc., where $d \ll (T_H - T_C)$. This occurs because much of the cooling of the fluid is accomplished by refrigerators acting through a small temperature difference, and hence acting at high efficiency. For the ideal fluid chiller comprised of an infinite number of successive refrigerators, each of ideal efficiency, the work required would be:

$$W_C = -\int_{T_H}^{T_C} \frac{T_H - T}{T} dQ \quad \text{Equation 3}$$

$$= -\int_{T_H}^{T_C} \frac{C(T_H - T)}{T} dT$$

$$= C\left(T_H \ln \frac{T_H}{T_C} - (T_H - T_C)\right)$$

with the resulting COP:

$$COP = Q_C / W_C = (T_H / (T_H - T_C) \ln(T_H / T_C) - 1)^{-1}. \quad \text{Equation 4}$$

The work input is lower than the single stage refrigerator because the generation of entropy that occurs when the initially warm fluid stream contacts the cold heat exchanger is no longer present. When $T_C$ is close to $T_H$, the best single stage refrigerator may require twice as much work input as a multi-stage ideal chiller. As the ratio of $T_H/T_C$ gets larger, the efficiency penalty may increase slightly; for example, for $T_H = 100°$ F. and $T_C = 45°$ F., the best single-stage refrigerator may consume 2.07 times more input work than an ideal multi-stage chiller.

An AMR-type magnetic refrigerator may be set up to act as a fluid chiller by relaxing the requirement of equal hot to cold and cold to hot total flows, and instead send more AMR beat transfer fluid from the hot to the cold ends of the demagnetized bed(s) than is returned from the cold to the hot ends of the magnetized bed(s), which is a case of unbalanced flow in the beds. The excess heat transfer fluid that accumulates at the cold end may be chilled in a nearly reversible manner from $T_H$ to $T_C$. This excess heat transfer fluid may be re-warmed in a counter-flow heat exchanger that chills an external fluid stream, such as water for a chilled water loop, or ventilation air for air conditioning a building. The warm excess heat transfer fluid may be returned to the hot end of the demagnetized AMR bed, once again becoming the excess heat transfer fluid flowing from the hot to cold ends of the AMR bed.

In the case of unbalanced flow in the beds, the hot to cold flow rate through each of the beds can be higher than the cold to hot flow, so it may be advantageous to make the hot inlet and cold outlet conduits shorter than the cold inlet and outlet conduits, as is shown in FIG. 11. In FIG. 11, fluid from the pump 30 passes through the hot heat exchanger 40, enters the hot inlet valve 22 and passes through the short conduit 64b into the demagnetized bed 4. Fluid leaves the bed 4 and passes through the short conduit 66b into the cold outlet valve 24. The fluid leaving the cold outlet valve 24 passes through the conduit 134 and is divided, with part of the fluid entering the first cold heat exchanger 60, and part of the fluid entering the second cold heat exchanger 129. The fluid leaving the first cold heat exchanger 60 enters the cold inlet valve 26 and is passed through the long conduit 72a into the magnetized bed 2, and then passes through the long conduit 82a into the hot outlet valve 28 and is returned to the inlet of the pump 30. The fluid leaving the second cold heat exchanger 129 enters the flow-proportioning valve 132 and is returned to the inlet of the pump 130. The first cold heat exchanger can be used to cool an external refrigeration load at a cold temperature near that of the temperature of the fluid leaving the cold outlet valve, while the second heat exchanger, with flow rate adjusted using flow proportioning valve 132, can be used to cool an external fluid stream over a large temperature range from a temperature near that of the fluid leaving the hot outlet valve to near a temperature of the fluid leaving the cold outlet valve. Because all of the fluid leaving the pump must pass through the hot inlet conduit 64b and cold inlet conduit 66b, but only some of the fluid leaving the pump must pass through the cold inlet conduit 72a and the hot outlet conduit 82a, making the conduits 64b and 66b shorter than the conduits 72a and 82a may reduce the overall pressure drop in the system. Note that although flow conduits of different function are of different lengths, conduits of the same function can still be of the same length, so all the beds can get similar flow versus time profiles during the AMR cycle.

The flow from an outlet valve to the pump in the embodiments described above only occurs in one direction, from the valve to the pump, and is thus unidirectional flow. This means that the fluid contained in the pipe 84 between the hot outlet valve 28 and the pump 30 in FIG. 2, for example, does not contribute to dead volume losses, and thus the pump 30 can be located outside the coaxial valve and bed assembly. This allows the use of any convenient type of pump. In particular, positive displacement pumps, such as gear pumps, screw pumps, piston pumps, diaphragm pumps, rotary vane pumps and scroll pumps, can be used. Positive displacement pumps produce a flow that is nearly constant over a wide range of operating pressures. The use of a positive displacement pump allows the flow rate to quickly reach intended levels as the flow is switched between different AMR beds. In addition, efficient positive displacement pumps can be made over a wide range of flow capacity and pressure capacity, while centrifugal pumps, a common form of non-positive displacement pump, are only efficient at relatively large flow capacity or low pressure capacity. Efficient heat transfer in AMR beds requires a large internal heat transfer area, which tends to lead to high operating pressures, which are not well suited to efficient operation of centrifugal pumps for small to medium scale systems.

If hot to cold flow or cold to hot flow occurs to only one bed at a time, the use of a positive displacement pump may require either precise valve timing to ensure flow is not blocked for a period of time, or alternately, the use of a fluid accumulator at the pump outlet.

Although the description of the present invention above has been based on the use of rotary disk valves, it is clear that other valve types that also rely on rotary motion to open and close desired fluid paths could be used and fall within the scope of the present invention.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A magnetic refrigeration system comprising:
at least a first and second bed of magnetocaloric material, each bed having a first and second opposed side between which fluid may flow;
at least one manifold communicating a hot inlet conduit and a hot outlet conduit to the first side of each bed and communicating a cold inlet conduit and a cold outlet conduit to the second side of each bed;
a magnet assembly movable to apply a greater magnetic field to the first bed than the second bed in a first state and a greater magnetic field to the second bed than the first bed in a second state;
a valve system communicating with the hot inlet conduit, the hot outlet conduit, the cold inlet conduit and the cold outlet conduit and synchronized to the magnet assembly to permit circulation of fluid through the first and second beds to remove heat from the first bed by providing flow through at least one first conduit pair, each pair being a series-connected cold inlet conduit and hot outlet conduit, and to add heat to the second bed in the first state by providing flow through at least one second conduit pair, each pair being a series-connected hot inlet conduit and cold outlet conduit; and
a pump circulating the fluid through the valve system and the hot inlet conduit, the hot outlet conduit, the cold inlet conduit and the cold outlet conduit of the at least first and second beds;
wherein each of the first conduit pairs are adapted to provide substantially equal fluid flow through each first conduit pair when connected for flow by the valve system and wherein each of the second conduit pairs are adapted to provide substantially equal fluid flow when connected for flow by the valve system;
wherein each first conduit pair has a substantially identical length and wherein each second conduit pair has a substantially identical length;
wherein the valve system provides four valves communicating with communicating the hot inlet conduit, the hot outlet conduit, the cold inlet conduit and the cold outlet conduit of the at least first and second beds including: a hot outlet valve, a hot inlet valve, a cold outlet valve and a cold inlet valve;
wherein in the first state the hot outlet valve connects the hot outlet conduit of the first bed to the inlet of a hot heat exchanger, and the cold inlet valve connects the cold inlet conduit of the first bed to an outlet of a cold heat exchanger, and the hot inlet valve connects the hot inlet conduit of the second bed to an outlet of the hot heat exchanger, and the cold outlet valve connects the cold outlet conduit of the second bed to an inlet of the cold heat exchanger;
wherein in the second state the hot outlet valve connects the hot outlet conduit of the second bed to the inlet of the hot heat exchanger, and the cold inlet valve connects the cold inlet conduit of the second bed to the outlet of the cold heat exchanger, and the hot inlet valve connects the hot inlet conduit of the first bed to the outlet of the hot heat exchanger, and the cold outlet valve connects the cold outlet conduit of the first bed to the inlet of the cold heat exchanger;
wherein the first and second bed are arranged around a central axis and the magnet assembly is attached to a shaft rotatable with respect to the first and second bed along the central axis; and
wherein the hot outlet valve, hot inlet valve, cold outlet valve and cold inlet valve are rotary valves having rotor portions attached coaxially about the shaft to move with respect to stationary stator portions positioned coaxially about the shaft.

2. The magnetic refrigeration system of claim 1 wherein each first conduit pair has substantially equal flow resistance and each second conduit pair has substantially equal flow resistance.

3. The magnetic refrigeration system of claim 1 wherein conduit pairs carrying greater flow are made shorter than conduit pairs carrying lesser flow.

4. The magnetic refrigeration system of claim 3 wherein the length of the first conduit pairs equals the length of the second conduit pairs.

5. The magnetic refrigeration system of claim 2 wherein each first conduit pair has substantially equal internal volume and each second conduit pair has substantially equal internal volume.

6. The magnetic refrigeration system of claim 2 wherein each first conduit pair has substantially equal change in internal volume as a function of change in pressure due to elasticity of the conduits and each second conduit pair has substantially equal change in internal volume as a function of changing pressure due to elasticity of the conduits.

7. The magnetic refrigeration system of claim 5 wherein a change in internal volume of each conduit pair to a bed of magnetocaloric material, when subjected to an increase from a minimum to a maximum fluid pressure during operation of the magnetic refrigeration system, is less than 5% of the total fluid volume delivered to a single bed of magnetocaloric material during the time interval that the conduit pair is delivering flow to the single bed of magnetocaloric material.

8. The magnetic refrigeration system of claim 2 wherein each of the hot inlet conduits is adapted to provide substantially equal resistance to fluid flow; each of the hot outlet conduits is adapted to provide substantially equal resistance to fluid flow; each of the cold inlet conduits is adapted to provide substantially equal resistance to fluid flow; and each of the cold outlet conduits is adapted to provide substantially equal resistance to fluid flow.

9. The magnetic refrigeration system of claim 1 wherein the hot outlet valve and the hot inlet valve include movable elements opening and closing the valves and are in mechanical communication with the magnet assembly and wherein the cold inlet valve and cold outlet valve are one-way valves actuated by fluid flow.

10. The magnetic refrigeration system of claim 1 wherein the hot outlet valve and hot inlet valve have stator portions fixed with respect to the at least first and second beds and rotor portions fixed with respect to the magnet wherein the stator portions are mounted between the rotor portions.

11. The magnetic refrigeration system of claim 1 further including a motor for rotating the shaft with respect to the at least first and second beds.

12. The magnetic refrigeration system of claim 1 including a plurality of magnetic beds including the first and second magnetocaloric beds arranged about the central axis and each having a manifold communicating a hot inlet conduit and a hot outlet conduit to the first side of the at least first and second magnetocaloric beds and communicating a cold inlet conduit and cold outlet conduit to the second side of the at least first and second magnetocaloric beds; and wherein the valve assembly provides valves attached to the shaft communicating with either inlet conduits or outlet conduits.

13. The magnetic refrigeration system of claim 1 wherein the valves provide substantially unobstructed communication with multiple inlet conduits or outlet conduits at one or more positions of the shaft.

14. The magnetic refrigeration system of claim 1 further including a pump circulating the fluid through the valve system and the hot inlet conduit, hot outlet conduit, cold inlet conduit, and cold outlet conduit; wherein the pump is a positive displacement pump.

15. The magnetic refrigeration system of claim 1 further including an electric motor moving the magnet assembly relative to the at least first and second beds.

16. The magnetic refrigeration system of claim 1 wherein the rotary valves contain a rotating disk-shaped element and a fixed disk-shaped element.

\* \* \* \* \*